US009565161B2

(12) United States Patent
Kaplinger et al.

(10) Patent No.: US 9,565,161 B2
(45) Date of Patent: Feb. 7, 2017

(54) AUTOMATICALLY REPLACING LOCALHOST AS HOSTNAME IN URL WITH FULLY QUALIFIED DOMAIN NAME OR IP ADDRESS

(75) Inventors: Todd E. Kaplinger, Raleigh, NC (US); James L. Lentz, Austin, TX (US); Christopher C. Mitchell, Raleigh, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 13/480,059

(22) Filed: May 24, 2012

(65) Prior Publication Data

US 2013/0318173 A1  Nov. 28, 2013

(51) Int. Cl.
G06F 11/30 (2006.01)
G06F 12/00 (2006.01)
H04L 29/12 (2006.01)

(52) U.S. Cl.
CPC .................. *H04L 61/301* (2013.01)

(58) Field of Classification Search
CPC .................................................... H04L 61/301
USPC .................. 709/245, 204–206; 715/751–759
See application file for complete search history.

(56) References Cited

U.S. PATENT DOCUMENTS

| 6,539,421 B1* | 3/2003 | Appelman ........... G06Q 10/107 709/206 |
|---|---|---|
| 7,020,700 B1 | 3/2006 | Bennett et al. |
| 7,181,497 B1* | 2/2007 | Appelman ........... G06Q 10/107 709/206 |
| 7,546,344 B1 | 6/2009 | Aravamudan et al. |
| 2003/0014450 A1* | 1/2003 | Hoffman ........... G06F 17/30887 715/257 |
| 2007/0160200 A1 | 7/2007 | Ishikawa et al. |
| 2009/0006556 A1* | 1/2009 | Agarwal et al. ............. 709/206 |
| 2011/0149979 A1 | 6/2011 | Uttaro et al. |

* cited by examiner

*Primary Examiner* — Kenneth R Coulter
(74) *Attorney, Agent, or Firm* — Robert A. Voigt, Jr.; Winstead, P.C.

(57) ABSTRACT

A method, system and computer program product for electronically communicating a correct Uniform Resource Locator (URL). The browser detects a copying of a URL to be placed in an electronic communication. In response to determining that the URL specifies an address of a loopback interface of the computing device via a localhost, the browser obtains the Fully Qualified Domain Name (FQDN) or Internet Protocol (IP) address of the computing device hosting the resource (e.g., application) referenced by the URL. The browser replaces the localhost in the URL with either the FQDN or IP address of the computing device. The modified URL is then made available to be shared with other users via electronic communication. In this manner, the localhost is automatically replaced with the correct domain name or IP address thereby ensuring that third party users will be able to retrieve the resource hosted on the computing device.

14 Claims, 5 Drawing Sheets

AUTOMATICALLY REPLACING LOCALHOST AS HOSTNAME IN URL WITH FULLY QUALIFIED DOMAIN NAME OR IP ADDRESS

TECHNICAL FIELD

The present invention relates to computer networking, and more particularly to automatically replacing the localhost in a Uniform Resource Locator (URL) as the hostname with the fully qualified domain name or the Internet Protocol (IP) address of the developer's computing system when the developer intends to electronically communicate the address of a resource hosted locally via the localhost.

BACKGROUND

In computer networking, the localhost (meaning this computer) is the standard hostname given to the address of a loopback network interface. On modern computer systems, the localhost as a hostname translates to an IPv4 address in the 127.0.0.0/8 (loopback) net block, usually 127.0.0.1.

Localhost is specified where one would otherwise use the hostname of a computer. For example, directing a web browser installed on a system running an HTTP server to the Uniform Resource Locator (URL) of http://localhost will display the home page of the local website, provided the server is configured to service the loopback interface.

Using the loopback interface is useful for testing software, such as web based applications, since it bypasses local network interface hardware. Connecting to locally hosted network services using loopback addresses puts less of a load on network resources.

While using the loopback interface is useful for testing software, the developer of the software may want to share in an electronic communication (e.g., e-mail, instant message) the URL that specifies the location of the application on the local machine. However, in order for other users to retrieve the application via the use of the URL, the localhost in the URL needs to be replaced with either the fully qualified domain name or the Internet Protocol (IP) address of the machine that is hosting the application.

Currently, in order to communicate the appropriate URL to the other users to retrieve the application hosted on the developer's machine, the developer manually copies the URL from his/her browser and replaces the localhost with either the fully qualified domain name or the Internet Protocol (IP) address of the machine that is hosting the application. However, such a process leads to errors, such as when the developer incorrectly copies and pastes the URL into a communication (e.g., e-mail) to another user or incorrectly types the domain name/IP address that replaces the localhost in the URL.

BRIEF SUMMARY

In one embodiment of the present invention, a method for electronically communicating a correct Uniform Resource Locator (URL) comprises detecting a copying of a URL from a browser to be placed in an electronic communication. The method further comprises obtaining either a fully qualified domain name or an Internet Protocol (IP) address of a computing device hosting a resource referenced by the URL in response to the URL specifying an address of a loopback interface of the computing device via a localhost. In addition, the method comprises replacing, by a processor, the localhost in the URL with either the fully qualified domain name or the IP address of the computing device.

Another form of the embodiment of the method described above is in a computer program product.

In another embodiment of the present invention, a method for electronically communicating a correct Uniform Resource Locator (URL) comprises detecting a copying of a URL from a browser to be placed in an electronic communication. The method further comprises obtaining one or more of a list of possible URLs and a list of possible Media Access Control (MAC) addresses encoded as a single URL for accessing a computing device hosting a resource referenced by one or more of the list of possible URLs and the list of possible MAC addresses in response to the URL specifying an address of a loopback interface of the computing device via a localhost. In addition, the method comprises replacing, by a processor, the URL containing the localhost with the single encoded URL.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for electronically communicating a correct Uniform Resource Locator (URL). In one embodiment of the present invention, the browser detects a copying of a URL to be placed in an electronic communication (e.g., electronic mail). In response to determining that the URL specifies an address of a loopback interface of the computing device via a localhost, the browser obtains the fully qualified domain name or Internet Protocol (IP) address of the computing device hosting the resource (e.g., application) referenced by the URL. The browser replaces the localhost of the URL with either the fully qualified domain name or the IP address of the computing device. The modified URL is then made available to be shared with other users via electronic communication (e.g., electronic mail). In this manner, the browser can automatically replace the localhost in the URL with the correct domain name or IP address thereby ensuring that third party users will be able to retrieve the resource hosted on the computing device. By having the browser perform such a function, errors in communicating the appropriate URL to other users to retrieve the resource hosted on the computing device will be greatly reduced.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
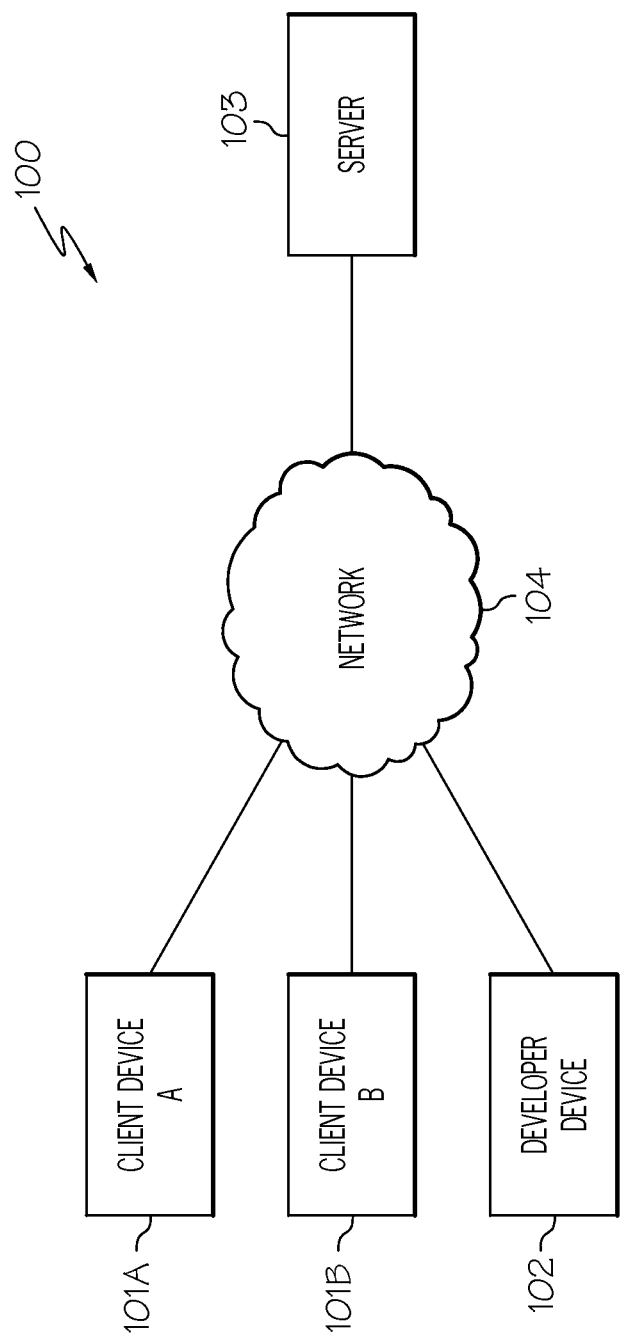
FIG. 1 illustrates a network system configured in accordance with an embodiment of the present invention.

Referring now to the Figures in detail, FIG. 1 illustrates a network system 100 for practicing the principles of the present invention in accordance with an embodiment of the present invention. Network system 100 includes client devices 101A-101B (identified as "Client Device A" and "Client Device B," respectively, in FIG. 1) as well as developer device 102 connected to a server 103 via a network 104. Client devices 101A-101B may collectively or individually be referred to as clients 101 or client 101, respectively. Developer device 102 refers to a computing device being used by a developer for testing a resource, such as software. The developer may be using the loopback interface for testing the resource, such as software, on developer device 102. Client 101 and developer device 102 may be similarly configured. Both client 101 and developer device 102 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to network 104 and consequently communicating with other clients 101/developer device 102 and server 103. Such communication includes, but not limited to, sending electronic mail messages, sending instant messages, etc.

Each client 101 and developer device 102 is configured to send and receive electronic communications, such as electronic mail. In one embodiment, each client 101 and developer device 102 includes a software agent (not shown), referred to herein as an e-mail client, configured to transfer electronic mail messages amongst each other. A description of the hardware configuration of client 101, developer device 102 is provided below in connection with FIG. 2.

Network 104 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In one embodiment, server 103 may represent a mail server that is configured to relay electronic mail messages sent between clients 101, developer device 102. Server 103 may also represent a domain name system server configured to translate human-memorable domain names (e.g., fully qualified domain names) and hostnames as well as Media Access Control (MAC) addresses into corresponding Internet Protocol (IP) addresses.

While FIG. 1 illustrates two clients 101A-101B, a single developer device 102 and a single server 103, network system 100 may include any number of clients 101, developer devices 102 and servers 103. The embodiments of network system 100 are not to be limited in scope to the depiction of FIG. 1.

Figure 2:
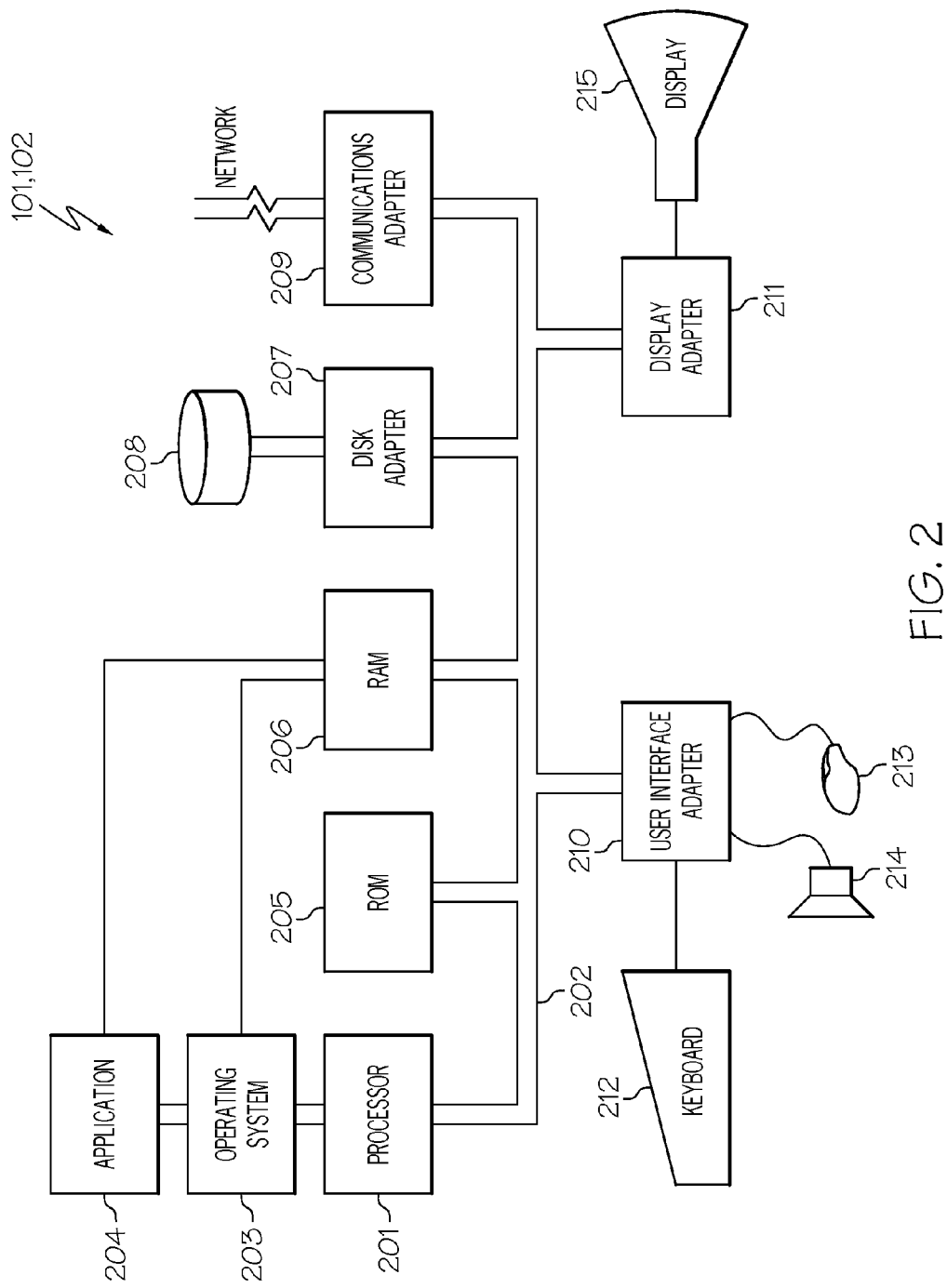
FIG. 2 illustrates a hardware configuration of a client device and a developer device configured in accordance with an embodiment of the present invention.

Referring now to FIG. 2, FIG. 2 illustrates a hardware configuration of client 101 (FIG. 1), developer device 102 (FIG. 1) which is representative of a hardware environment for practicing the present invention. Client 101, developer device 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a browser for electronically communicating a correct URL as discussed further below in association with FIGS. 3 and 4.

Referring again to FIG. 2, read-only memory ("ROM") 205 is coupled to system bus 202 and includes a basic input/output system ("BIOS") that controls certain basic functions of client 101, developer device 102. Random access memory ("RAM") 206 and disk adapter 207 are also coupled to system bus 202. It should be noted that software components including operating system 203 and application 204 may be loaded into RAM 206, which may be client's 101, developer device's 102 main memory for execution. Disk adapter 207 may be an integrated drive electronics ("IDE") adapter that communicates with a disk unit 208, e.g., disk drive. It is noted that the browser for electronically communicating a correct URL, as discussed further below in association with FIGS. 3 and 4, may reside in disk unit 208 or in application 204.

Client 101, developer device 102 may further include a communications adapter 209 coupled to bus 202. Communications adapter 209 interconnects bus 202 with an outside network (e.g., network 104 of FIG. 1) thereby enabling client 101, developer device 102 to communicate with other clients 101, developer devices 102 and servers 103. For example, developer device 102 may access a proxy component (e.g., proxy server) for obtaining the IP address of developer device 102 or access server 103 (domain name system server) for translating the fully qualified domain name of developer device 102 to its IP address when developer device 102 has relocated.

I/O devices may also be connected to client 101, developer device 102 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client 101, developer device 102 through keyboard 212 or mouse 213 and receiving output from client 101, developer device 102 via display 215 or speaker 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, while using the loopback interface is useful for testing software, the developer of the software may want to share in an electronic communication (e.g., e-mail, instant message) the URL that specifies the location of the application being hosted on the local machine. However, in order for other users to retrieve the application via the use of the URL, the localhost in the URL needs to be replaced with either the fully qualified domain name or the Internet Protocol (IP) address of the machine that is hosting the application. Currently, in order to communicate the appropriate URL to the other users to retrieve the application hosted on the developer's machine, the developer manually copies the URL from his/her browser and replaces the localhost with either the fully qualified domain name or the Internet Protocol (IP) address of the machine that is hosting the application. However, such a process leads to errors, such as when the developer incorrectly copies and pastes the URL into a communication (e.g., e-mail) to another user or incorrectly types the domain name/IP address that replaces the localhost in the URL.

Figure 3:
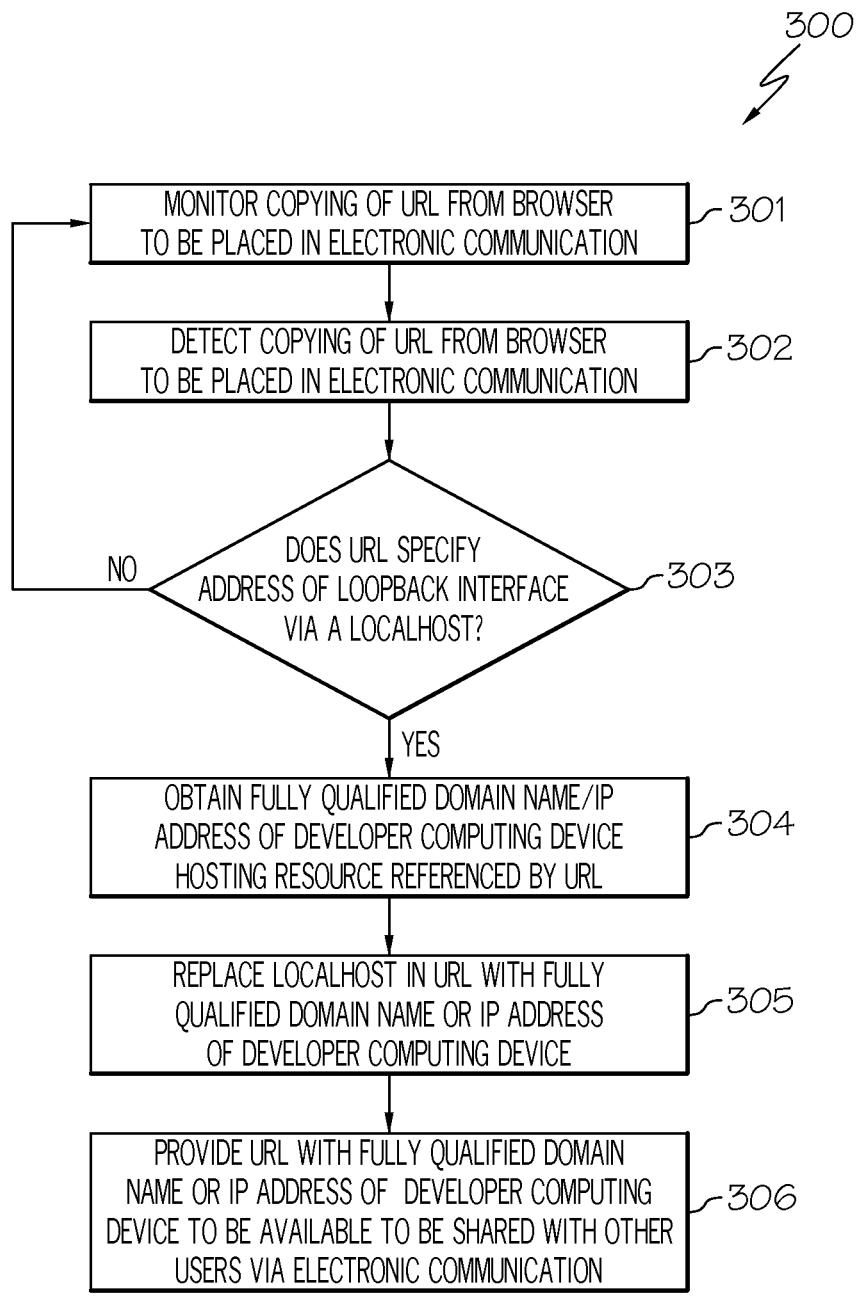
FIG. 3 is a flowchart of a method for electronically communicating a correct URL when a developer intends to electronically communicate the address of a resource hosted locally via the localhost in accordance with an embodiment of the present invention.

The principles of the present invention provide a means for electronically communicating a correct URL by automatically replacing the localhost in the URL with the fully qualified domain name or the IP address of the computing system when a developer intends to electronically communicate the address of a resource hosted locally via the alias localhost, as discussed further below in connection with FIG. 3. FIG. 3 is a flowchart of a method 300 for electronically communicating a correct URL when a developer intends to electronically communicate the address of a resource hosted locally via the localhost in accordance with an embodiment of the present invention.

Referring to FIG. 3, in conjunction with FIGS. 1 and 2, the browser of developer device 102 monitors the copying of a Uniform Resource Locator (URL) to be placed in an electronic communication, such as an electronic mail message or an instant message.

In step 302, the browser of developer device 102 detects the copying of the URL to be placed in an electronic communication.

In step 303, a determination is made by the browser of developer device 102 as to whether the URL specifies the address of a loopback interface of developer device 102 via a localhost. For example, if the developer was testing an application (e.g., web based application) using the loopback interface and was copying the URL (e.g., http://localhost/myapp/index.html) specifying the location of the application being hosted on developer device 102 via the localhost, then the browser would detect a URL specifying an address of a loopback interface of developer device 102 via the localhost.

If the URL does not specify an address of a loopback interface via a localhost, then the browser of developer device 102 continues to monitor the copying of a Uniform Resource Locator (URL) to be placed in an electronic communication, such as an electronic mail message or an instant message, in step 301.

If, however, the browser of developer device 102 detects a copying of a URL to be placed in an electronic communication, where the URL specifies the address of the loopback interface of developer device 102 via a localhost, then, in step 304, the browser of developer device 102 obtains the fully qualified domain name (e.g., myhost.myco.com) or IP address of developer device 102 hosting the resource (e.g., application) referenced by the URL. In one embodiment, the browser of developer device 102 queries operating system 203 for the fully qualified domain name or IP address of developer device 102. In one embodiment, the browser obtains the IP address of developer device 102 from a proxy component (e.g., proxy server). In one embodiment, the browser of developer device 102 accesses a domain name system server 103 for translating the fully qualified domain name into the appropriate IP address when the local host machine (i.e., developer device 102) is relocated.

In step 305, the browser of developer device 102 replaces the localhost of the URL with either the fully qualified domain name or the IP address of developer device 102. For example, if the developer was copying the URL of http://localhost/myapp/index.html, specifying the location of the resource being hosted on developer device 102 via the localhost, to be placed into an electronic communication and the fully qualified domain name was "myhost.myco.com," then the browser would replace the localhost in the URL with the fully qualified domain name as follows: http://myhost.myco.com/myapp/index.html. In this manner, the browser can automatically replace the localhost in the URL with the correct domain name or IP address thereby ensuring that third party users (e.g., clients 101A, 101B) will be able to retrieve the resource (e.g., application) hosted on developer device 102. By having the browser perform such a function, errors in communicating the appropriate URL to other users to retrieve the resource hosted on the developer's machine (developer device 102) will be greatly reduced.

In step 306, the browser of developer device 102 provides the URL with the fully qualified domain name or IP address of developer device 102 to be available to be shared with other users via electronic communication (e.g., electronic mail, instant messaging). For example, the browser will then enable the developer to use the URL of "http://myhost.myco.com/myapp/index.html" instead of the URL of "http://localhost/myapp/index.html" in an electronic communication to other users (e.g., clients 101A, 101B) thereby enabling third party users (e.g., clients 101A, 101B) to retrieve the resource (e.g., application) hosted on the developer's machine (developer device 102).

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

There are times, however, that developer device 102 contains multiple Ethernet ports which may not all be available to clients 101 who receive the electronic communication from the developer containing the modified URL as discussed above. Also, developer device 102 may contain virtual private network-like connections which may not be available to clients 101 who receive the electronic communication from the developer containing the modified URL as discussed above. As a result, the user of client 101 may not be able to access the resource (e.g., software being developed by the developer) on developer device 102. A method for addressing such a situation is provided below in connection with FIGS. 4A-4B.

Figure 4A:
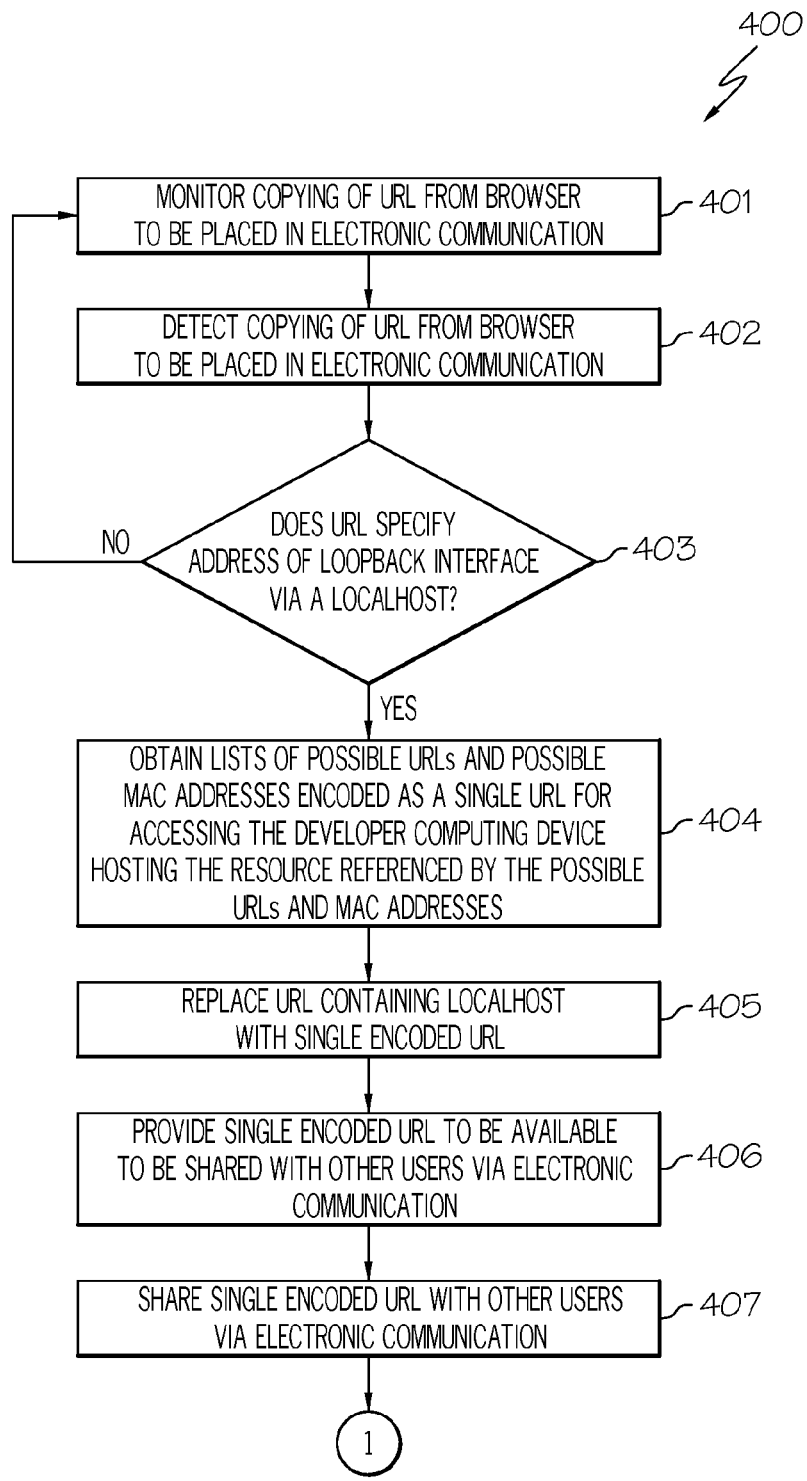
FIGS. 4A-4B are a flowchart of a method for electronically communicating a correct URL when not all of the ports or virtual private network-like connections of the developer device are available to clients to access the resource being hosted by the developer device via the localhost in accordance with an embodiment of the present invention.
Figure 4B:
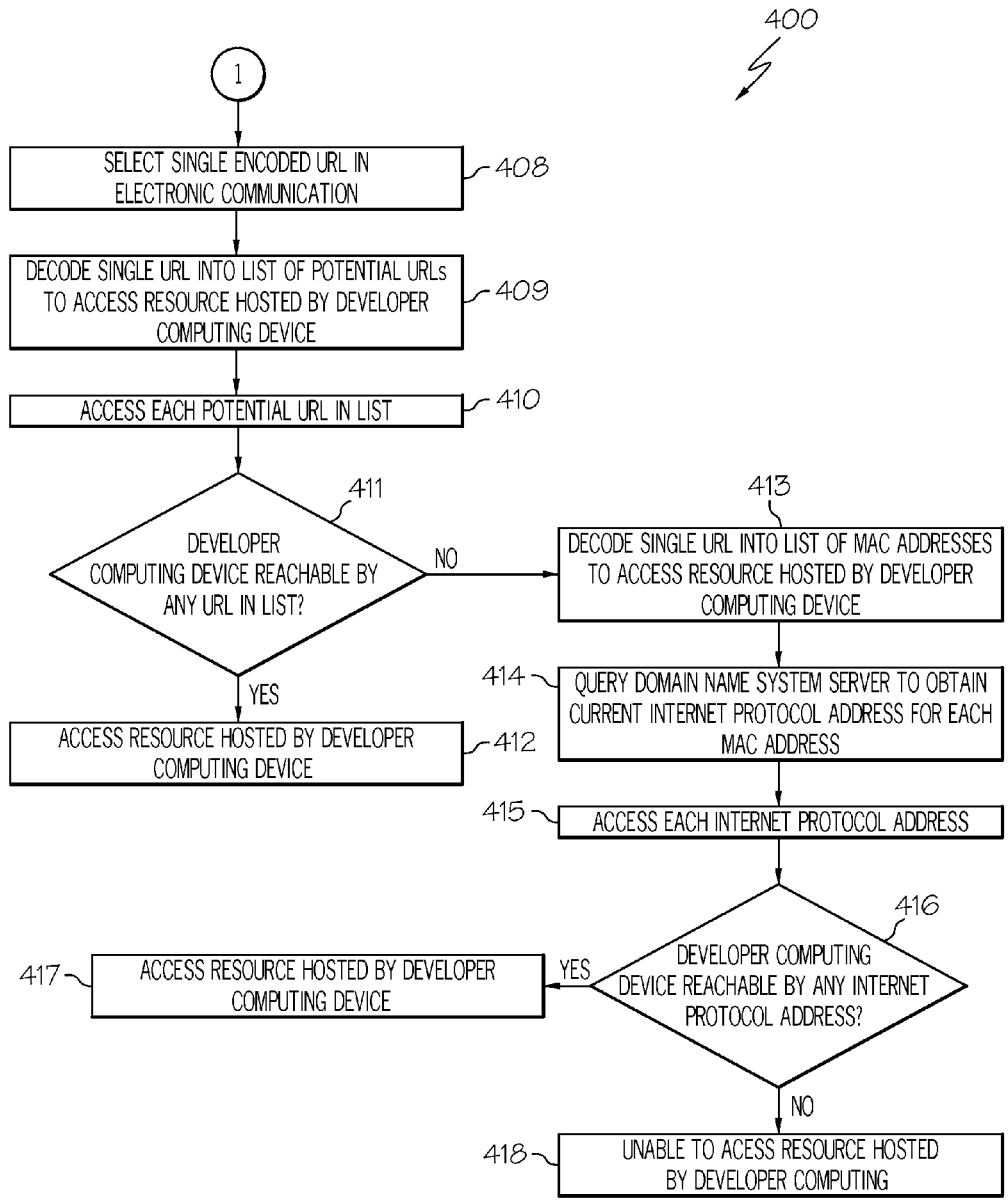

FIGS. 4A-4B are a flowchart of a method 400 for electronically communicating a correct URL when not all of the ports or virtual private network-like connections of developer device 102 are available to clients 101 to access the resource being hosted by developer device 102 via the localhost in accordance with an embodiment of the present invention.

Referring to FIG. 4A, in conjunction with FIGS. 1 and 2, the browser of developer device 102 monitors the copying of a Uniform Resource Locator (URL) to be placed in an electronic communication, such as an electronic mail message or an instant message.

In step 402, the browser of developer device 102 detects the copying of the URL to be placed in an electronic communication.

In step 403, a determination is made by the browser of developer device 102 as to whether the URL specifies the address of a loopback interface of developer device 102 via a localhost. For example, if the developer was testing an application (e.g., web based application) using the loopback interface and was copying the URL (e.g., http://localhost/myapp/index.html) specifying the location of the application being hosted on developer device 102 via the localhost, then the browser would detect a URL specifying an address of a loopback interface of developer device 102 via the localhost.

If the URL does not specify an address of a loopback interface via a localhost, then the browser of developer device 102 continues to monitor the copying of a Uniform Resource Locator (URL) to be placed in an electronic communication, such as an electronic mail message or an instant message, in step 401.

If, however, the browser of developer device 102 detects a copying of a URL to be placed in an electronic communication, where the URL specifies the address of the loopback interface of developer device 102 via a localhost, then, in step 404, the browser of developer device 102 obtains a list of possible URLs for accessing developer device 102 that is hosting the resource referenced by the possible URLs. In one embodiment, the list of possible URLs is encoded as a single URL. In one embodiment, the browser of developer device 102 queries operating system 203 for the list of possible URLs.

There are times, however, that the IP address of developer device 102 may have changed, and, as a result, the list of possible URLs may not contain a URL that accesses the resource (e.g., application) being hosted by developer device 102. For example, in development environments, the machines may not have a dedicated IP address associated with them. As a result, in one embodiment, the browser of developer device 102 may further obtain a list of possible Media Access Control (MAC) addresses for accessing developer device 102. In one embodiment, both lists of URLs and MAC addresses are encoded as a single URL. In one embodiment, the browser of developer device 102 queries operating system 203 for the lists of possible URLs and MAC addresses for accessing developer device 102.

In step 405, the browser of developer device 102 replaces the URL containing the localhost with the single encoded URL. For example, if the developer was copying the URL of http://localhost/myapp/index.html, specifying the location of the resource being hosted on developer device 102 via the localhost, to be placed into an electronic communication and the single encoded URL was http://myshortener/#encodedURIData, then the browser would replace the URL containing the localhost with the single encoded URL (e.g., http://myshortener/#encodedURIData). In this manner, the browser can automatically replace the URL containing the localhost with a list of possible URLs and a list of possible MAC addresses for accessing developer device 102 thereby ensuring that third party users (e.g., clients 101A, 101B) will be able to retrieve the resource (e.g., application) hosted on developer device 102 as discussed further below. By having the browser perform such a function, errors in communicating the appropriate URL to other users to retrieve the application hosted on the developer's machine (developer device 102) will be greatly reduced.

In step 406, the browser of developer device 102 provides the single encoded URL to be available to be shared with other users via electronic communication (e.g., electronic mail, instant messaging). For example, the browser will then enable the developer to use the single encoded URL of "http://myshortener/#encodedURIData" instead of the URL of "http://localhost/myapp/index.html" in an electronic communication to other users (e.g., clients 101A, 101B) thereby enabling third party users (e.g., clients 101A, 101B) to retrieve the resource (e.g., application) hosted on the developer's machine (developer device 102).

In step 407, the browser of developer device 102 shares the single encoded URL with other users (e.g., clients 101A, 101B) via an electronic communication. For example, the single encoded URL may be placed in an electronic communication, such as an e-mail, which is then sent to other users, such as clients 101A, 101B, via e-mail server 103. The electronic mail message containing the single encoded URL may be sent to e-mail server 103, which then relays the electronic mail message to the e-mail clients of the users of clients 101A, 101B.

Referring now to FIG. 4B, in conjunction with FIGS. 1-2, in step 408, the user of client 101 that received the electronic communication containing the single encoded URL, selects the single encoded URL in the electronic communication.

In step 409, the browser of client 101 decodes the single URL into a list of potential URLs to access the resource hosted by developer device 102.

In step 410, the browser of client 101 accesses each potential URL in the list to determine if developer device 102 is reachable.

In step 411, a determination is made by the browser of client 101 as to whether developer device 102 is reachable by any of the URLs in the list.

If developer device 102 is reachable by a URL in the list, then, in step 412, client 101 accesses the resource (e.g., application) hosted by developer device 102 that is referenced by the URL.

If, however, developer device 102 is not reachable by any of the URLs in the list, then, in step 413, the browser of client 101 decodes the single URL into a list of MAC addresses to access the resource hosted by developer device 102.

In step 414, the browser of client 101 queries a domain name system server 103 to obtain a current IP address for each MAC address in the list of MAC addresses.

In step 415, the browser of client 101 accesses each IP address obtained from domain name system server 103 to determine if developer device 102 is reachable.

In step 416, a determination is made by the browser of client 101 as to whether developer device 102 is reachable by any of the IP addresses obtained from domain name system server 103.

If developer device 102 is reachable by an IP address obtained from domain name system server 103, then, in step 417, client 101 accesses the resource (e.g., application) hosted by developer device 102 that is referenced by the obtained IP address If, however, developer device 102 is not reached by any of the IP addresses obtained from domain name system server 103, then, in step 418, client 101 is not able to access the resource (e.g., application) hosted by developer device 102.

In some implementations, method 400 may include other and/or additional steps that, for clarity, are not depicted. Further, in some implementations, method 400 may be executed in a different order presented and that the order presented in the discussion of FIGS. 4A-4B is illustrative. Additionally, in some implementations, certain steps in method 400 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for a software developer to electronically communicate a correct Uniform Resource Locator (URL), the method comprising:

detecting a copying of a URL from a browser to be placed in an electronic communication;

obtaining one of a fully qualified domain name and an Internet Protocol (IP) address of a computing device hosting a resource referenced by said URL in response to said URL specifying an address of a loopback interface of said computing device via a localhost, wherein said loopback interface is used for testing software;

replacing, by a hardware processor of a developer device, automatically said localhost in said URL with one of said fully qualified domain name and said IP address of said computing device thereby ensuring that third party users will be able to retrieve said resource;

providing said URL with one of said fully qualified domain name and said IP address of said computing device to be available to be shared with other users via said electronic communication; and accessing a domain name system server for translating said fully qualified domain name into said IP address in response to said computing system being relocated.

2. The method as recited in claim 1, wherein said electronic communication comprises one of the following: electronic mail and instant messaging.

3. The method as recited in claim 1 further comprising:
querying an operating system of said computing device for one of said fully qualified domain name and said IP address of said computing device.

4. The method as recited in claim 1 further comprising:
obtaining said IP address of said computing device from a proxy component.

5. A computer program product embodied in a non-transitory computer readable storage medium for enabling a software developer to electronically communicate a correct Uniform Resource Locator (URL), the computer program product comprising the programming instructions for:
detecting a copying of a URL from a browser to be placed in an electronic communication;
obtaining one of a fully qualified domain name and an Internet Protocol (IP) address of a computing device hosting a resource referenced by said URL in response to said URL specifying an address of a loopback interface of said computing device via a localhost, wherein said loopback interface is used for testing software;
replacing automatically said localhost in said URL with one of said fully qualified domain name and said IP address of said computing device thereby ensuring that third party users will be able to retrieve said resource;
providing said URL with one of said fully qualified domain name and said IP address of said computing device to be available to be shared with other users via said electronic communication; and
accessing a domain name system server for translating said fully qualified domain name into said IP address in response to said computing system being relocated.

6. The computer program product as recited in claim 5, wherein said electronic communication comprises one of the following: electronic mail and instant messaging.

7. The computer program product as recited in claim 5 further comprising the programming instructions for:
querying an operating system of said computing device for one of said fully qualified domain name and said IP address of said computing device.

8. The computer program product as recited in claim 5 further comprising the programming instructions for:

obtaining said IP address of said computing device from a proxy component.

9. A method for a software developer to electronically communicate a correct Uniform Resource Locator (URL), the method comprising:
detecting a copying of a URL from a browser to be placed in an electronic communication;
obtaining one or more of a list of possible URLs and a list of possible Media Access Control (MAC) addresses encoded as a single URL for accessing a computing device hosting a resource referenced by one or more of said list of possible URLs and said list of possible MAC addresses in response to said URL specifying an address of a loopback interface of said computing device via a localhost, wherein said loopback interface is used for testing software;
replacing, by a hardware processor of a developer device, automatically said URL containing said localhost with said single encoded URL thereby ensuring that third party users will be able to retrieve said resource;
providing said single encoded URL to be available to be shared with other users via said electronic communication; and
decoding said single encoded URL into said list of possible URLs to access said resource hosted by said computing device.

10. The method as recited in claim 9 further comprising:
accessing each potential URL in said list of possible URLs.

11. The method as recited in claim 10 further comprising:
accessing said resource hosted by said computing device in response to said computing device being reachable by a URL in said list of possible URLs.

12. The method as recited in claim 10 further comprising:
decoding said single encoded URL into said list of possible MAC addresses in response to said computing device not being reachable by any URL in said list of possible URLs.

13. The method as recited in claim 12 further comprising:
querying a domain name system server to obtain a current Internet Protocol (IP) address for each MAC address in said list of possible MAC addresses.

14. The method as recited in claim 13 further comprising:
accessing each obtained IP address; and
accessing said resource hosted by said computing device in response to said computing device being reachable by an IP address obtained from said domain name system server.

\* \* \* \* \*